United States Patent
Fuchs et al.

(10) Patent No.: US 6,310,357 B1
(45) Date of Patent: Oct. 30, 2001

(54) DEVICE FOR READING OUT A STORAGE LUMINOPHORE PLATE

(75) Inventors: Manfred Fuchs, Nuremberg; Erich Hell; Detlef Mattern, both of Erlangen, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/568,544

(22) Filed: May 11, 2000

(30) Foreign Application Priority Data

May 14, 1999 (DE) .............................. 199 22 345

(51) Int. Cl.⁷ .................................................. G01N 23/04
(52) U.S. Cl. ........................ 250/587; 250/584; 250/586
(58) Field of Search ................................ 250/584, 585, 250/586, 587

(56) References Cited

U.S. PATENT DOCUMENTS

| | | |
|---|---|---|
| 4,587,036 | 5/1986 | Degenhardt . |
| 4,694,163 | 9/1987 | Ohgoda et al. . |
| 4,742,225 | 5/1988 | Chan . |
| 5,724,121 | * 3/1998 | McKinley et al. ........................ 355/53 |

FOREIGN PATENT DOCUMENTS

| | | |
|---|---|---|
| OS 38 03 766 | 8/1989 | (DE) . |
| OS 195 06 798 | 8/1996 | (DE) . |
| OS 197 52 925 | 6/1999 | (DE) . |
| 0 142 865 | 5/1985 | (EP) . |
| 0 859 244 | 8/1998 | (EP) . |

* cited by examiner

Primary Examiner—Robert H. Kim
Assistant Examiner—Hoon Koo Song
(74) Attorney, Agent, or Firm—Schiff Hardin & Waite

(57) ABSTRACT

An apparatus for reading out a storage luminophore plate has a holder for the storage luminophore plate as well as for a detector line, and a device for setting the spacing between the storage luminophore plate and the detector line such that this spacing is controlled or regulated to be substantially constant with reference to the storage luminophore plate, at least over the region of the detector line.

10 Claims, 3 Drawing Sheets

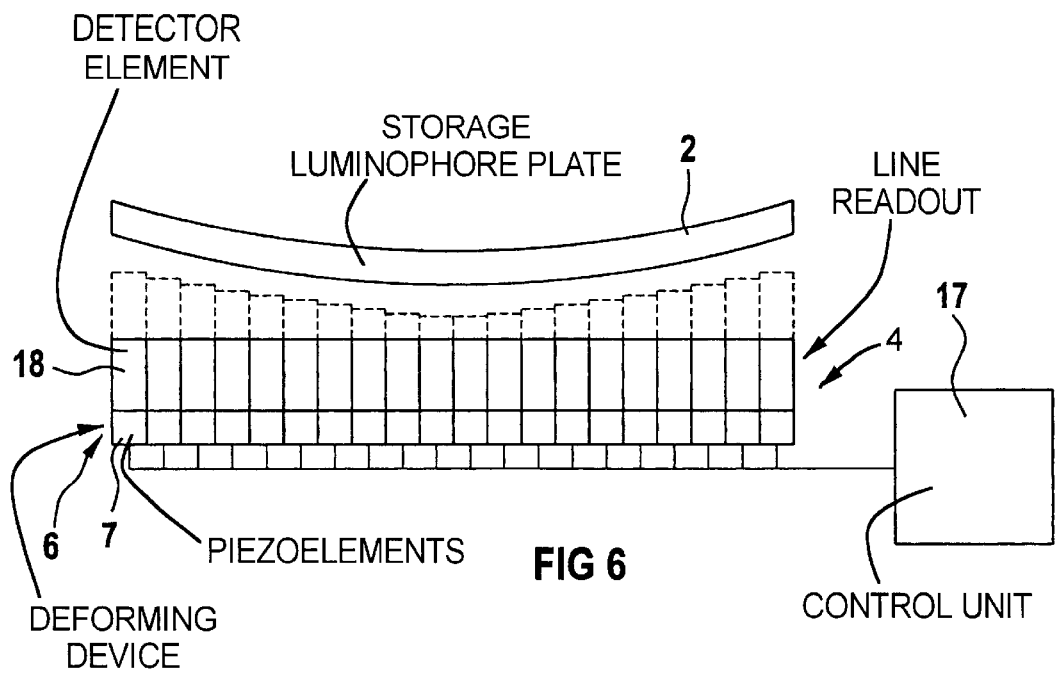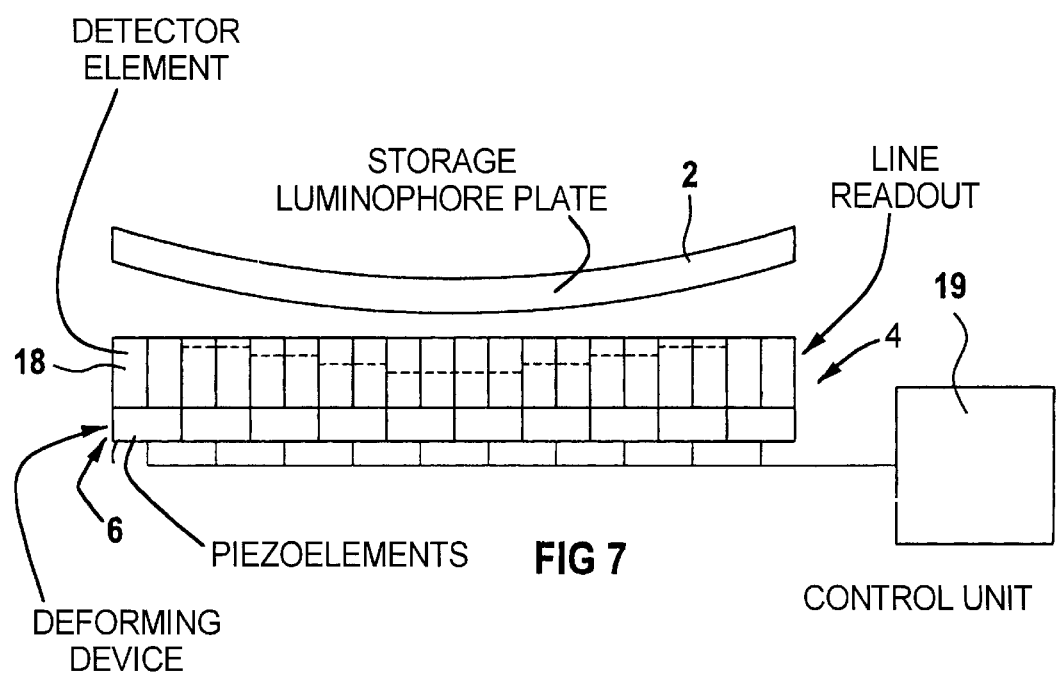

DEVICE FOR READING OUT A STORAGE LUMINOPHORE PLATE

BACKGROUND OF THE INVENTION

1. Field of the Invention

The present invention is directed to a method for reading out a storage luminophore plate, of the type used to store an image produced in a medical x-ray system.

2. Description of the Prior Art

The scanning of storage luminophore plates with a stimulation laser is known. The area employed for imaging is thereby scanned point-by-point along lines. The speed of this scanning is limited by the minimum integration time required for each picture element, this integration time being prescribed by the decay time of the storage luminophore. The readout time for the entire image format given current devices amounts to 1–2 minutes and is actually too slow for modern hospital operation. Moreover, such a device for line-by-line punctiform scanning with a mechanically guided laser beam, and readout with a photo multiplier has a large structure. Due to its large structure, this device cannot be integrated into a medical X-ray system but must be erected separately therefrom, which requires space and room. The physical transport of the storage luminophore plate with corresponding time delay and risks of mix-ups, etc., between the actual X-ray exposure and the digitization on the basis of the readout of the storage luminophore plate with the device and the transmission of the data are disadvantages associated with this type of device.

German OS 195 06 798 discloses an alternative to the aforementioned scanner device. German OS 195 06 798 discloses a device for reading out storage luminophore plates wherein a contact pressure means for a storage luminophore film is provided and with which the storage luminophore film can be pressed planarly against a counter-plate and fixed. An aSi:H detector matrix is arranged at the opposite side of the counter-plate. This detector matrix and the storage luminophore film thus can be aligned in substantially parallel planes relative to one another via the contact pressure device.

A detector matrix as disclosed in German OS 195 06 798 is expensive to manufacture and, due to the multitude of detector elements, the risk of an outage of individual detector elements is relatively high, which degrades the signal output.

U.S. Pat. No. 4,694,163 discloses a device for readout of a storage luminophore plate with which the storage luminophore plate can be subjected to a sag. This device has a roller that can be adjusted from a first position, in which it has no contact with the storage luminophore plate, into a second position in which it effects a sag of the storage luminophore plate. A good and constant guidance of the storage luminophore plate is to be assured due to the sag of the storage luminophore plate.

SUMMARY OF THE INVENTION

An object of the present invention is to provide a device for the readout of a storage luminophore plate which, with a compact and economic structure, enables a fast readout of the storage luminophore plate.

The above object is achieved in accordance with the principles of the present invention in a device for reading out a storage luminophore plate having a holder for the storage luminophore plate as well as for a detector line, and a device for setting a spacing between the storage luminophore plate and the detector line, wherein the spacing is controlled or regulated so as to be substantially constant relative to the storage luminophore plate, at least within the region of the detector line.

The above object is also achieved in accordance with the principles of the present invention in a device wherein the storage luminophore plate exhibits a sag at a central region thereof, and wherein the detector line is flexible, and wherein the device for maintaining a substantially constant spacing between the storage luminophore plate and the detector line deforms the detector line so as to conform to the sag of the storage luminophore plate, thereby controlling or regulating the spacing so as to be substantially constant, at least within the region of the detector line.

An advantage of the invention is that only one detector line is employed, so that the detector is economic and the relative risk of outage of detector elements is low. Because the spacing between the detector line and the storage luminophore plate is substantially the same over the area of the detector line, the modulation transfer function does not vary in a location-dependent manner along the detector line. Measured signals that are uninfluenced by location thus can be derived from the detector line, these being able to be further-processed into easily diagnosed image signals. Since only one line-shaped detector line is employed in the subject matter of the invention, the device is compact in structure and can also be integrated in an X-ray diagnostics apparatus, if desired. The readout time is reduced compared to the line-by-line punctiform scanning since the signals of a line can, preferably, be simultaneously read out.

It is advantageous for the detector line to be flexibly fashioned and for the detector line to be caused to sag in a manner to a sag of the storage luminophore plate. The modulation transfer function thus is not disadvantageously influenced by an unequal spacing from the detector line caused by the sag of the storage luminophore plate.

Since the storage luminophore plate exhibits the largest sag in the region of its center axis, it is advantageous when the device for effecting the sag acts in the middle region of the detector line, so that this also exhibits the largest sag in that region and the modulation transfer function is not disadvantageously influenced.

A device that engages at least one edge of the detector line for effecting the sag has an equivalent effect.

Alternatively, the device can engage an opposite edge of the detector line for effecting the sag.

It has proven advantageous to employ piezoelements for effecting the sag. These piezoelement elements are inexpensive and require only a slight space in order to effect a sag of the detector line. Alternatively, at least one electromechanical element can also be employed.

The drive of the device for effecting the sag is preferably dependent on the x/y coordinates of the detector line with reference to the storage luminophore plate since the sag is not constant over the entire area of the storage luminophore plate.

In an embodiment of the invention, the detector elements of the detector line can be adjustable in terms of the spacing from the storage luminophore plate. The spacing between the detector elements and the storage luminophore plate is best maintained when the detector elements are individually adjustable in terms of the spacing. Due to the many adjustment devices and their drive, however, this embodiment is very complicated. It is therefore advantageous to arrange the detector elements in groups that are adjustable with respect to the spacing from the storage luminophore plate because fewer adjustment device are required. Matching to the sag of the storage luminophore plate, however, is then not as good.

DESCRIPTION OF THE DRAWINGS

FIG. 6 shows a device according to FIG. 1 having individually, adjustable detector elements of the detector line.

FIG. 7 shows a device according to FIG. 1 having groups of detector elements that are adjustable in terms of the spacing.

DESCRIPTION OF THE PREFERRED EMBODIMENTS

Figure 1:
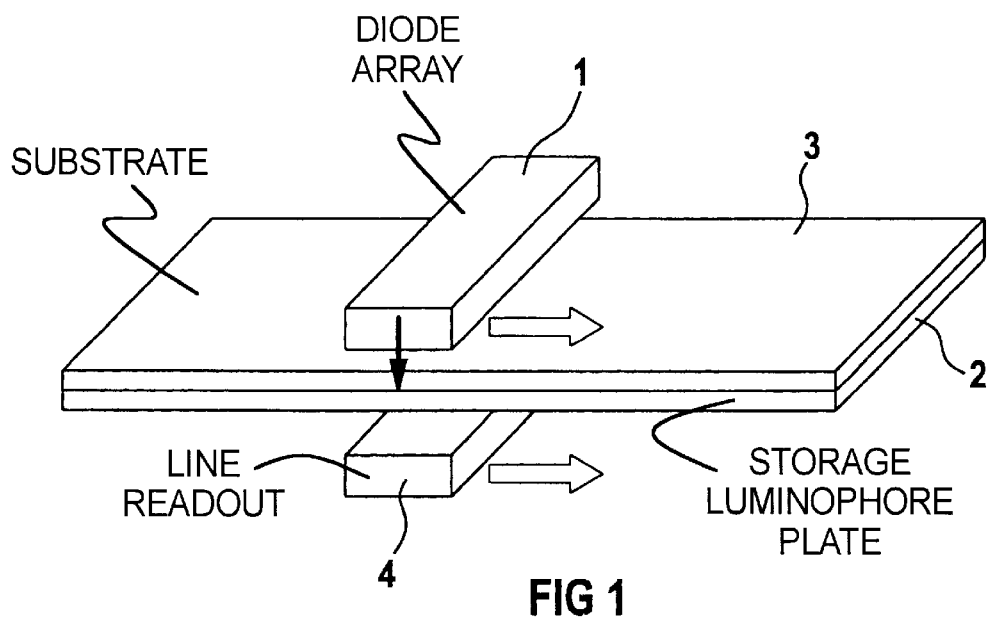
FIG. 1 is a schematic illustration of a device of the invention.

FIG. 1 shows a device for reading out a storage luminophore plate in a schematic fashion.

This device has a line diode array 1. In a known way, this line diode array 1 serves the purpose of generating excitation light for the storage luminophore plate 2. A optical lens system, which is not shown in detail, can be allocated to the line diode array 1 for generating a parallel light ray beam. The storage luminophore plate 2 is preferably arranged on a substrate 3 that, for example, is composed of glass, but is at least composed of an optically transparent material. A line readout 4 that covers at least one detector line and that receives the excitation light emanating from the storage luminophore plate 2 and converts it into electrical signals is allocated to the line diode array 1. The (at least one) detector line is preferably fashioned as a CCD detector line. This CCD detector line can have fiber optics allocated to it in order to conduct the light emanating from the storage luminophore plate 2 to the CCD detector elements in channeled fashion. For scanning the storage luminophore plate 2, the line diode array 1 and the line readout 4 are adjustable along the storage luminophore plate 2 allocated to one another. To this end, the line diode array 1 and the line readout 4 can be seated at a common carriage and can be adjustable with a drive, preferably an electromotive drive, via guide rails allocated along the carriage. Alternatively, the line diode array 1 and the line readout 4 can be respectively seated adjustably at a carriage or at guide rails.

Figure 2:
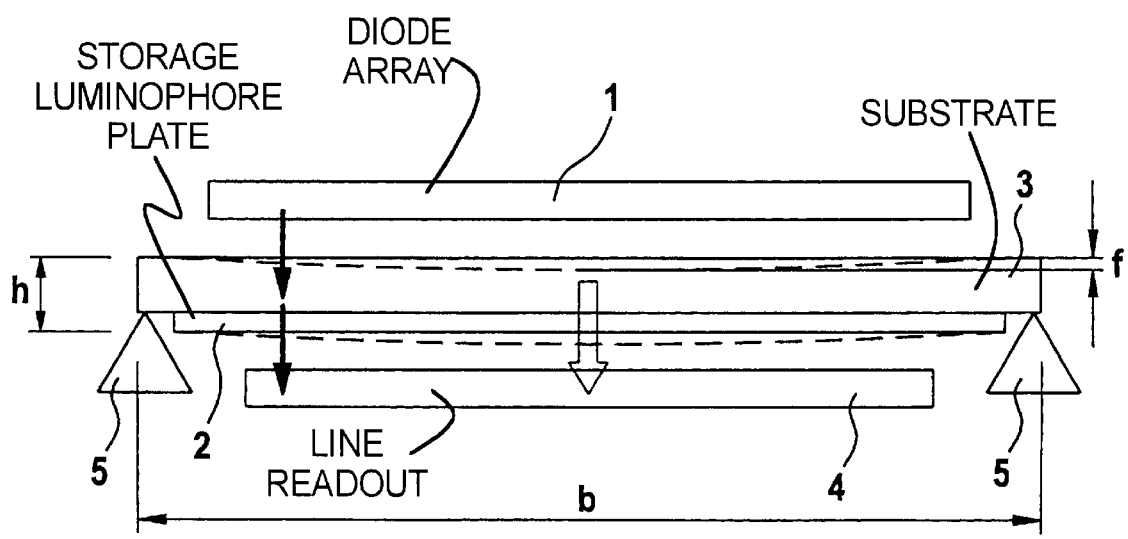
FIG. 2 is a plan view of the device according to FIG. 1.

FIG. 2 illustrates a problem when reading out a storage luminophore plate. Identical elements are identified with the same reference characters in this FIG. 2 as well as in all other figures. It can be seen from FIG. 2 that, when seating the storage luminophore plate 2 on support elements 5 that, for example, are fashioned as the guide rails, the storage luminophore plate 2 exhibits a sag f due to the force of gravity $F=m \cdot g = p \cdot b^2 \cdot h \cdot g$ (assuming the length and the width of the plate 2 are equal and are designated b). The sag $f = c_3 (p \cdot g \cdot b^4)/(E \cdot h^2)$ wherein $c_3$ is a proportionality constant and wherein p is the density of the plate 2 and E is Young's modulus of the material of the plate 2. Due to the gravitational weight of the storage luminophore plate 2, thus, it sags from the edge toward the middle. The sag f is proportional to the fourth power of the storage luminophore plate length b and inversely proportional to the second power of the thickness h of the storage luminophore plate 2. The sag of a predetermined storage luminophore plate 2 having an area $a \cdot b$ can thus only be reduced by increasing the thickness h thereof. Increasing the thickness h of a storage luminophore plate 2 to preclude or reduce sag, however, increases the light absorption of the substrate 3 that, for example, is composed of glass, of the focused diode light emanating from the line diode array 1. This attenuation must be low enough so that the information stored in the storage luminophore plate 2 can be read out by the line readout 4. If the thickness of the substrate 3 is too large, then the modulation transfer function upon penetration of the stimulation light emanating from the line diode array 1 is degraded. Such a sag of the storage luminophore plate 2 is shown with a broken line. It can be seen that the storage luminophore plate 2 thus has a smaller spacing from the line readout 4 in the middle region than in the edge region thereof, i.e. the region close to the bearing elements 5. The signals emanating from the line readout 4 therefore—assuming uniform luminescence of the storage luminophore plate 2—differ from the center of the line readout 4 toward the edges thereof. This is undesirable particularly because the modulation transfer function varies from the center of the line readout 4 toward its edge as a result.

For solving this problem, exemplary embodiments of a device according to the invention are schematically presented below in FIGS. 3 through 7.

Figure 3:
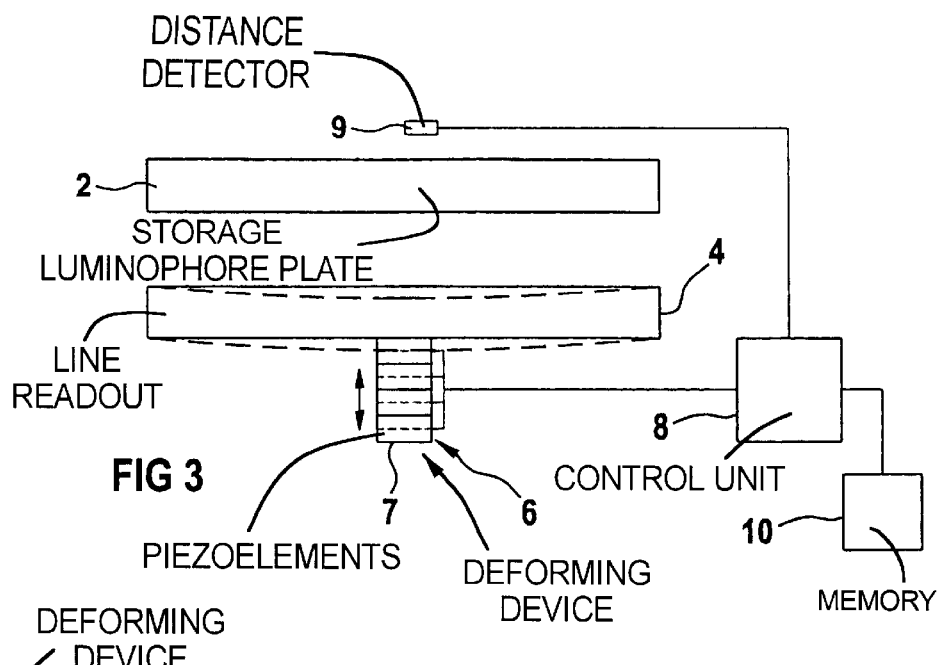
FIG. 3 shows a device according to FIG. 1 having an arrangement for producing a sag.

As can be seen from FIG. 3, for effecting a sag of the line readout 4, a deforming device 6 for effecting or neutralizing a sag engages the center-proximate region thereof. This deforming device 6 can be implemented as an electromechanical device, with piezoelements 7 that can be driven by a control unit 8 being employed in the exemplary embodiment. The signals of a distance detector 9 that acquires the sag of the storage luminophore plate 2 are supplied to the control unit 8. An ultrasound device, an optical means, an acoustic device or a light barrier can be employed as the distance detector 9. Alternatively, however, the control unit 8 can be supplied with data stored in a lookup table in a memory 10, the data being based on the location-dependent sag of the storage luminophore plate 2. The data can be computationally determined or can be acquired in a location-dependent manner via, for example, the distance detector 9 and can be stored. Location-dependent "sag" datasets can be stored in this memory 10 respectively for different formats of the storage luminophore plates 2, so that a distance detector 9 can be omitted. The control of the sag of the line readout 4 on the basis of the data stored in the memory 10, however, only corresponds to an average of the sag for various storage luminophore plates 2 having the same format. Deviation of the individual storage luminophore plate 2 from this average thus cannot be taken into consideration. An especially exact determination of the sag, and thus a more precise drive of the piezoelements 7, is obtained by employing the signals from the distance detector 9. Of course, signals from a number of distance detectors 9 can also be utilized.

Figure 4:
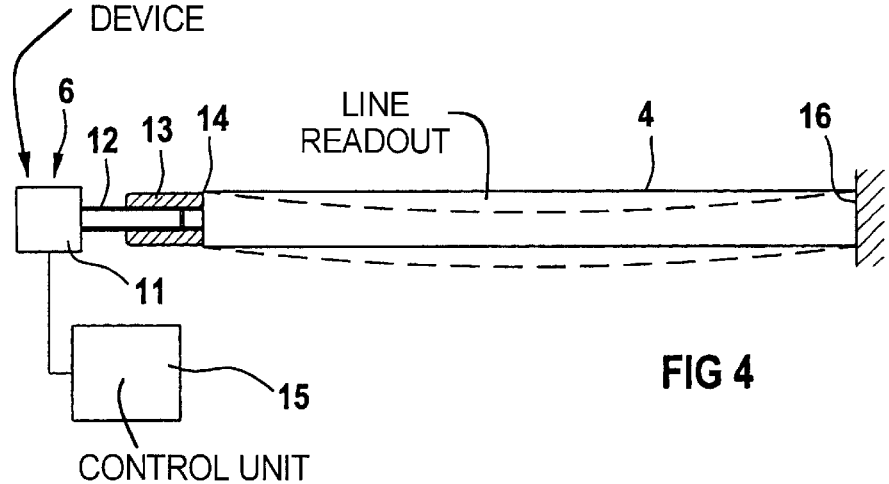
FIG. 4 shows a device according to FIG. 1 having a further embodiment of an arrangement for producing a sag.

A further version of an inventive device is shown in FIG. 4. A device 6 engages at least one edge 14 of the line readout 4 to produce a sag. This device 6 has a drive 11 with a spindle 12 that engages the edge of the line readout 4 via a spindle nut 13. By driving the device 6, i.e. the drive 11, via a control unit 15, a force acts via the spindle 12 and the spindle nut 13 on the edge 14 in order to produce a sag when the opposite edge 16 of the line readout 4 is rigidly seated. The control unit 15 also can be supplied with the signals from the distance detector 9 or with the data stored in the memory 10 for controlling or setting the sag of the line readout 4.

Figure 5:
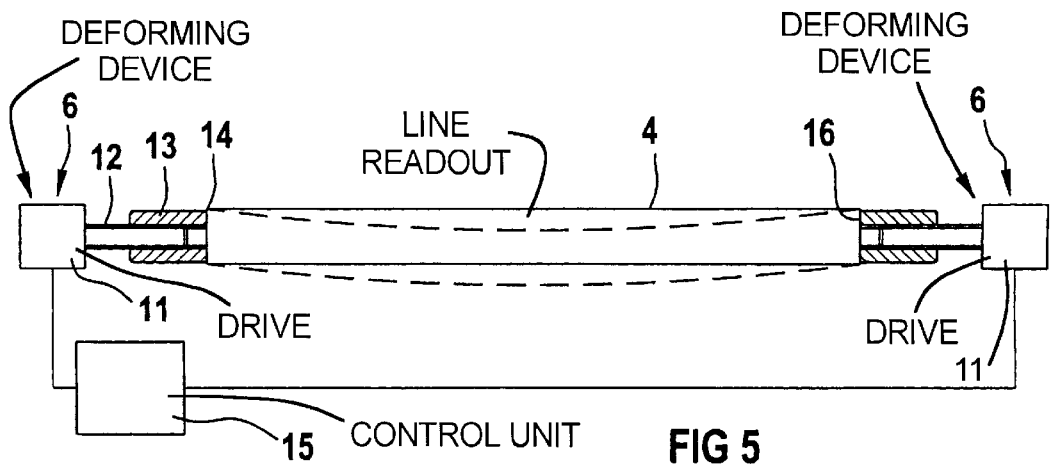
FIG. 5 shows a device according to FIG. 1 with two arrangements for producing a sag.

As shown in FIG. 5, augmenting the exemplary embodiment of FIG. 4, a further device 6 is provided at the opposite edge 16 for effecting a sag of the line readout 4, the signals of the control unit 15 also being supplied thereto.

A further version of the inventive device is shown in FIG. 6, wherein each detector element 18 of the line readout 4 has a respective device 6, preferably a piezoelement 7, allocated to it that can be driven by a control unit 17 in order to effect an adjustment in the direction toward the storage luminophore plate 2. It is self-evident that it is not only one piezoelement 7 that can be employed for this purpose, but also a number of piezoelements 7 are preferably connected following one another. The signals for driving the piezoelements 7 can be supplied to the control means 17—as already explained—via a distance detector 9 or as data from the memory 10. In a somewhat more economic in alternative according to FIG. 6, a number of detector elements of the line readout 4 have a device 6 allocated to them, these being driven by a control unit 19 to produce an adjustment of the detector elements dependent on the sag of the storage luminophore plate 2.

In the exemplary embodiments according to FIGS. 6 and 7, the detector elements can either be adjusted in the direction toward the storage luminophore plate 2—in the outer edge region as shown in FIG. 6—or they can be adjusted away from the storage luminophore plate 2 in the middle region—as shown in FIG. 7.

Although modifications and changes may be suggested by those skilled in the art, it is the intention of the inventors to embody within the patent warranted hereon all changes and modifications as reasonably and properly come within the scope of their contribution to the art.

We claim as our invention:

1. A device for reading out a storage luminophore plate, comprising:
    a detector line for detecting radiation emitted by a storage luminophore plate;
    a holder for said detector line and for a storage luminophore plate; and
    a device for setting a spacing between said storage luminophore plate and said detector line and for regulating said spacing to be substantially constant relative to said storage plate, at least within a region of said detector line.

2. A device for reading out a storage luminophore plate, said storage luminophore plate having a central region and exhibiting a sag within said central region, said device comprising:
    a flexible detector line for detecting radiation emitted by a storage luminophore plate;
    a holder for said detector line and for a storage luminophore plate; and
    a device for setting a spacing between said detector line and said storage luminophore plate and for controlling said spacing to maintain said spacing substantially constant at least within a region of said detector line, said device causing a deformation of said detector line adapted to conform to said sag of said storage luminophore plate.

3. A device as claimed in claim 2 wherein said device for setting a spacing acts within a middle region of said detector line.

4. A device as claimed in claim 2 wherein said device for setting a spacing engages at least one edge of said detector line.

5. A device as claimed in claim 2 wherein said device for setting a spacing engages opposite edges of said detector line.

6. A device as claimed in claim 2 wherein said device for setting a spacing comprises a plurality of piezoelements for deforming said detector line.

7. A device as claimed in claim 2 wherein said device for setting a spacing comprises at least one electromechanical element for deforming said detector line.

8. A device as claimed in claim 2 wherein said device for setting a spacing includes a drive unit which causes deformation of said detector line dependent on respective coordinates along an x-axis and a y-axis of said detector line relative to said storage luminophore plate.

9. A device for reading out a storage luminophore plate comprising:
    a detector line for detecting radiation emitted by a storage luminophore plate, said detector line comprising a plurality of detector elements;
    a holder for said detector line and for a storage luminophore plate; and
    a device for setting a spacing between said detector line and said storage luminophore plate and for controlling said spacing to maintain said spacing substantially constant relative to said luminophore plate, at least within a region of said detector line, said device for setting a spacing individually adjusting respective positions of said detector elements relative to said storage luminophore plate.

10. A device for reading out a storage luminophore plate comprising:
    a detector line for detecting radiation emitted by a storage luminophore plate, said detector line comprising a plurality of detector elements;
    a holder for said detector line and for a storage luminophore plate; and
    a device for setting a spacing between said detector line and said storage luminophore plate and for controlling said spacing to maintain said spacing substantially constant relative to said luminophore plate, at least within a region of said detector line, said device for setting a spacing adjusting respective positions of groups of said detector elements relative to said storage luminophore plate.

* * * * *